United States Patent

Ibamoto et al.

[19]

[11] Patent Number: 6,063,004
[45] Date of Patent: May 16, 2000

[54] CONTROL APPARATUS AND CONTROL METHOD FOR AN ENGINE POWERTRAIN OF A VEHICLE

[75] Inventors: Masahiko Ibamoto, Hitachinaka; Hiroshi Kuroiwa, Hitachi; Kazuhiko Sato, Hitachiohta; Toshimichi Minowa, Mito, all of Japan

[73] Assignees: Hitachi, Ltd.; Hitachi Car Engineering Co., both of Japan

[21] Appl. No.: 08/982,306

[22] Filed: Dec. 1, 1997

[30] Foreign Application Priority Data

Nov. 29, 1996 [JP] Japan ................................. 8-319047

[51] Int. Cl.[7] ................................................ F16H 59/00
[52] U.S. Cl. ................................................ 477/47; 477/40
[58] Field of Search ................................. 477/45, 46, 47, 477/48

[56] References Cited

U.S. PATENT DOCUMENTS 4,616,621  10/1986  Kuroiwa et al. .
4,718,306  1/1988  Shigematsu et al. ................. 477/48 X
4,771,752  9/1988  Nishimura et al. .
4,852,429  8/1989  Kumzer et al. ......................... 477/46 X
5,213,012  5/1993  Suzuki ................................... 477/48 X
5,803,862  9/1998  Ochiai et al. .......................... 477/48 X

FOREIGN PATENT DOCUMENTS 59-70853   4/1984  Japan .
62-225743  10/1987  Japan .

*Primary Examiner*—Khoi Q. Ta
*Attorney, Agent, or Firm*—Evenson, McKeown, Edwards & Lenahan, P.L.L.C.

[57] ABSTRACT

A control apparatus and control method for an engine powertrain of a vehicle including a CVT type automatic transmission and a lean burn engine. The control apparatus is designed to compute an engine torque in a stoichiometric area or a lean burn area, calculate an output torque from a present transmission ratio and a present torque ratio, calculate a transmission ratio change so that the output torque approximates a target torque, and vary the transmission ratio. With this configuration, shock due to steps in the output torque can be prevented to obtain a comfortable acceleration feeling.

10 Claims, 10 Drawing Sheets

ENGINE TORQUE CHARACTERISTIC IN STOICHIOMETRIC AREA

ENGINE TORQUE CHARACTERISTIC IN LEAN-BURN AREA

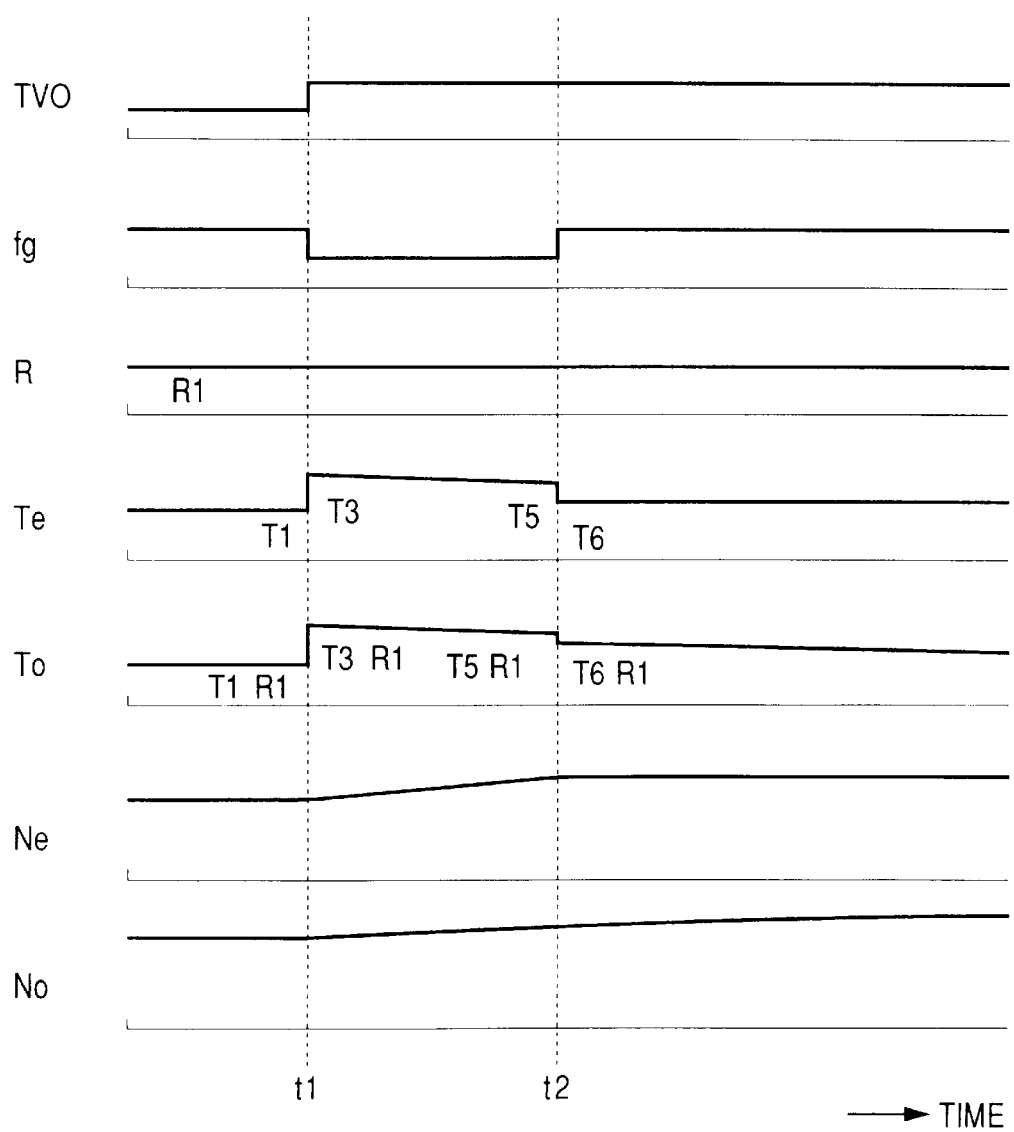

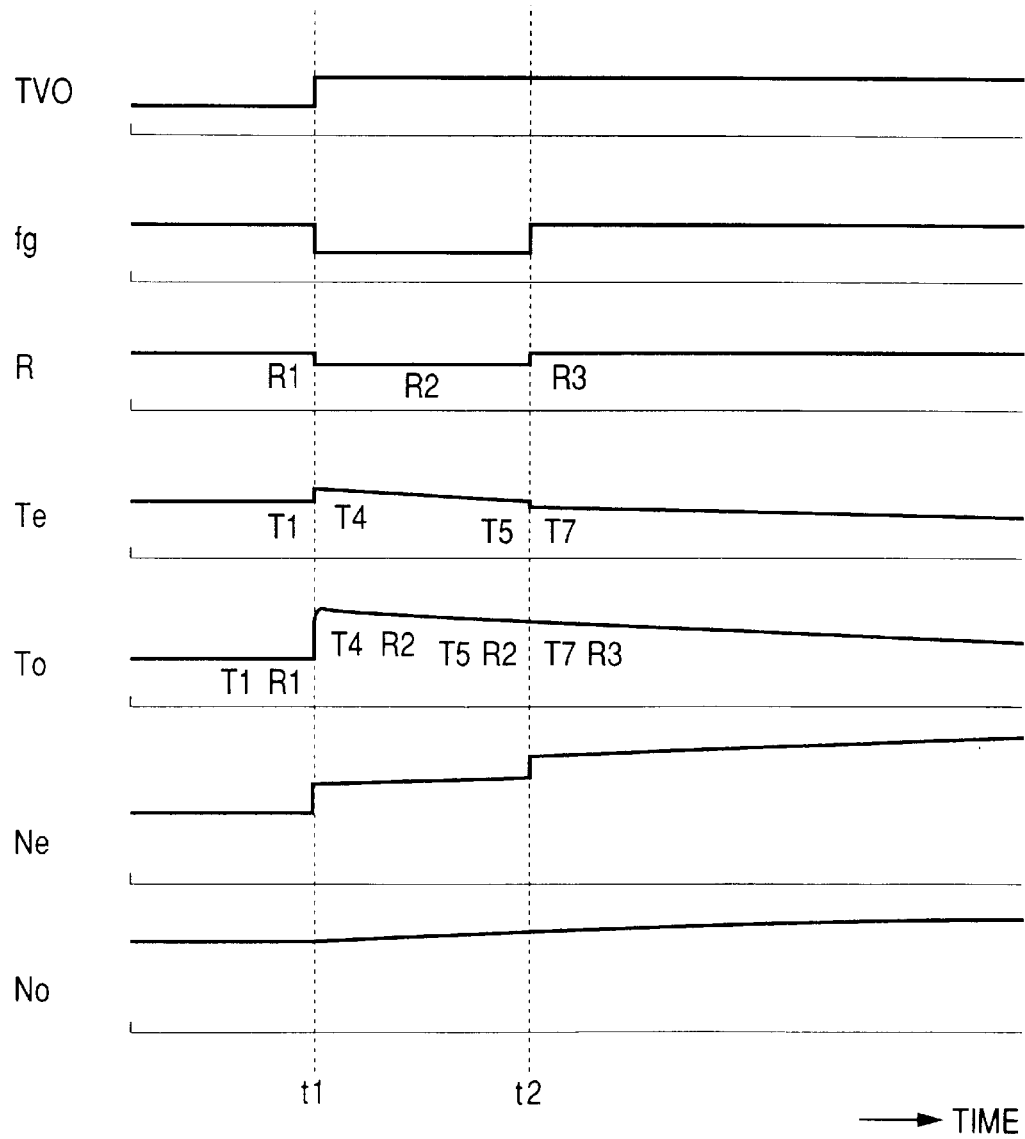

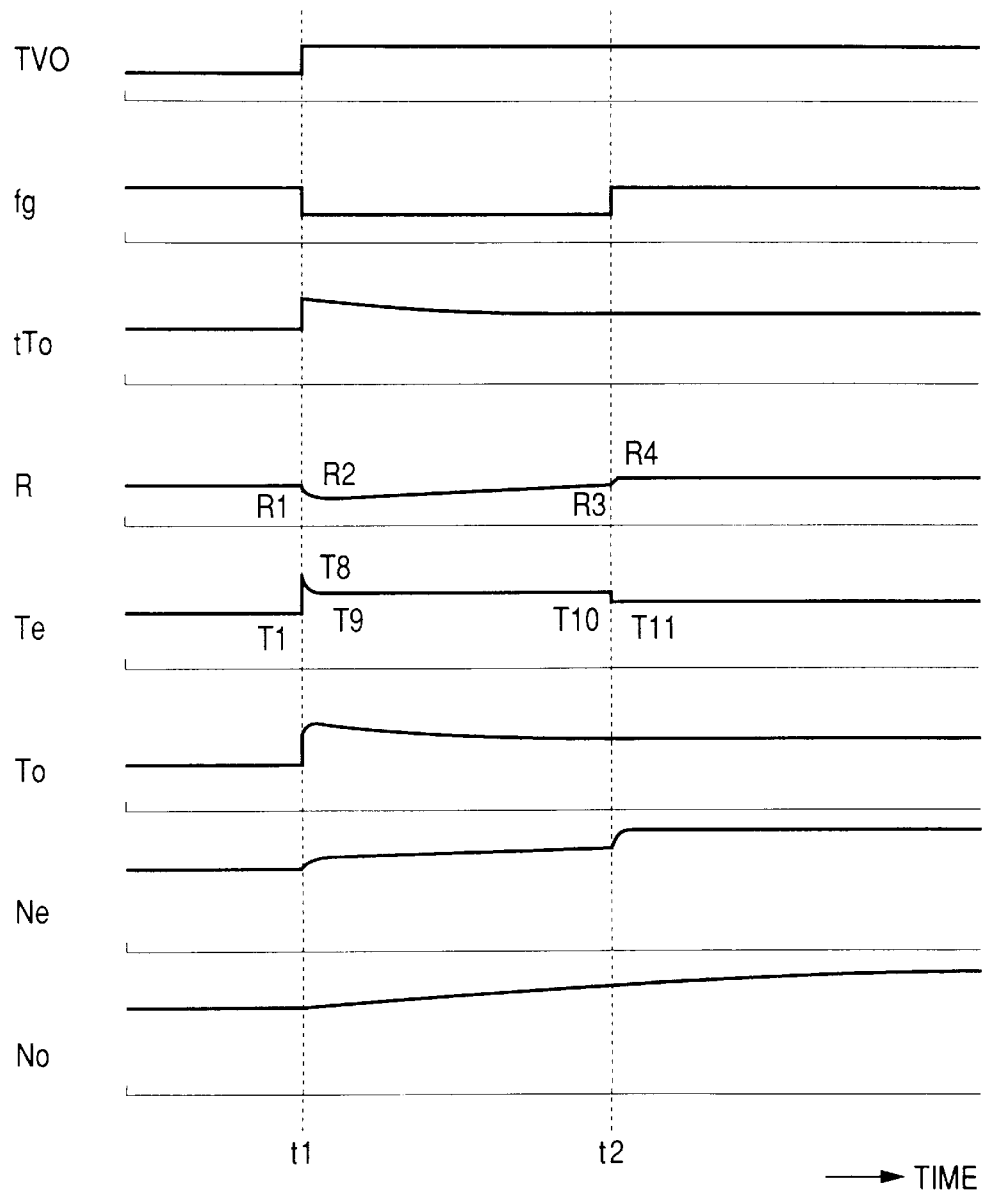

CONTROL APPARATUS AND CONTROL METHOD FOR AN ENGINE POWERTRAIN OF A VEHICLE

BACKGROUND OF THE INVENTION

This application claims the priority of Japanese application 8-319047, the disclosure of which is expressly incorporated by reference herein.

The present invention relates to a control apparatus and control method for an engine powertrain of a vehicle, and more particularly to a control apparatus and control method for an engine powertrain of a vehicle suitably applied to a type such that an output from a lean burn engine operated selectively at a stoichiometric air-fuel ratio or at a lean air-fuel ratio is transmitted through a CVT (Continuously Variable Transmission) to wheels of the vehicle.

In a vehicle having a CVT type automatic transmission, a transmission ratio is controlled generally by using a value searched from a transmission ratio data table preliminarily stored in a memory, according to a vehicle speed and an opening of a throttle valve for controlling the amount of intake air to be introduced into an engine. The relation between accelerator pedal operation and acceleration torque in this control follows that in the control of a multistep automatic transmission. That is, when the accelerator pedal is depressed to accelerate the vehicle, the transmission ratio is increased so as to increase a drive torque, whereas when the accelerator pedal is returned to an original position, the transmission ratio is decreased so as to reduce noise and improve fuel economy because no drive torque is required, thus providing good drivability such that no discomfort is felt by the driver.

In such control, however, it is necessary to preliminarily determine control constants for various assumed operating conditions, so that much time and labor are required for working so called tuning or matching in designing. In particular, the number of steps in forward speed in a multistep automatic transmission is about 4 to 6, while the number of steps in forward speed in a CVT type automatic transmission is infinite, or continuous. Accordingly, vast amounts of time and labor are taken to create the transmission ratio data table mentioned above. To solve this problem, it may be considered to control a transmission ratio as computing an optimum transmission ratio during running, thereby greatly saving the time and labor for tuning. An example of this control is described in Japanese Patent Laid-open No. 7-174219 proposed by the present inventors.

However, an engine and engine management system such that an engine torque is varied in no proportion to the depression amount of an accelerator pedal have recently been put to practical use. Examples of such an engine include a lean burn engine, a direct injection gasoline engine, and an engine combined with an electronically controlled throttle valve. However, the above-mentioned conventional transmission ratio control cannot be applied to transmission ratio control for the combination of such an engine or engine management system and a CVT type automatic transmission.

For example, it is now assumed that the above-mentioned conventional transmission ratio control is applied to a vehicle having a lean burn engine capable of running at a lean air-fuel ratio (in a lean burn condition) and a CVT type automatic transmission. In this case, when an accelerator pedal is depressed to accelerate the vehicle in the lean burn condition of the engine, the transmission ratio is increased and the lean air-fuel ratio is changed to a stoichiometric air-fuel ratio, so as to increase an acceleration torque. At this time, the throttle valve opening is increased by the depression of the accelerator pedal to cause an increase in intake air amount. Such an increase in throttle valve opening and a change from the lean air-fuel ratio to the stoichiometric air-fuel ratio cause a rapid increase in engine torque, making the driver feel a discomfort. Further, a rapid increase in drive torque in running on a slippery road invites spinning of tires, which is dangerous.

When the acceleration is finished, the air-fuel ratio is returned to the stoichiometric air-fuel ratio to the lean air-fuel ratio, and the engine torque is accordingly decreased. Such a decrease in the engine torque causes shock, which is transmitted to a vehicle body, resulting in an uncomfortable feeling by the driver.

It is accordingly an object of the present invention to provide a control apparatus and control method for an engine powertrain of a vehicle including a lean burn engine and a CVT type automatic transmission which can obtain a comfortable acceleration feeling proportional to the depression amount of an accelerator pedal and can eliminate the shock due to changing of an air-fuel ratio.

According to the present invention, the CVT type automatic transmission is controlled by computing an engine torque according to an engine combustion condition, computing an output torque of the transmission from the engine torque, a transmission ratio and a torque ratio of a torque converter, estimating an output torque demanded by a driver from a vehicle speed and an accelerator pedal depression amount, and computing a control value of the transmission ratio so that a deviation between the output torque computed and the output torque demanded becomes small. As a result, a comfortable acceleration feeling can be obtained and the shock due to changing of an air-fuel ratio can be suppressed.

BRIEF DESCRIPTION OF THE DRAWINGS

FIG. 6 is a time chart of the conventional control;

FIG. 7 is a time chart of the control according to the first preferred embodiment of the present invention;

FIG. 10 is a time chart of the control according to the second preferred embodiment of the present invention.

DETAILED DESCRIPTION OF THE PREFERRED EMBODIMENTS

Figure 1:
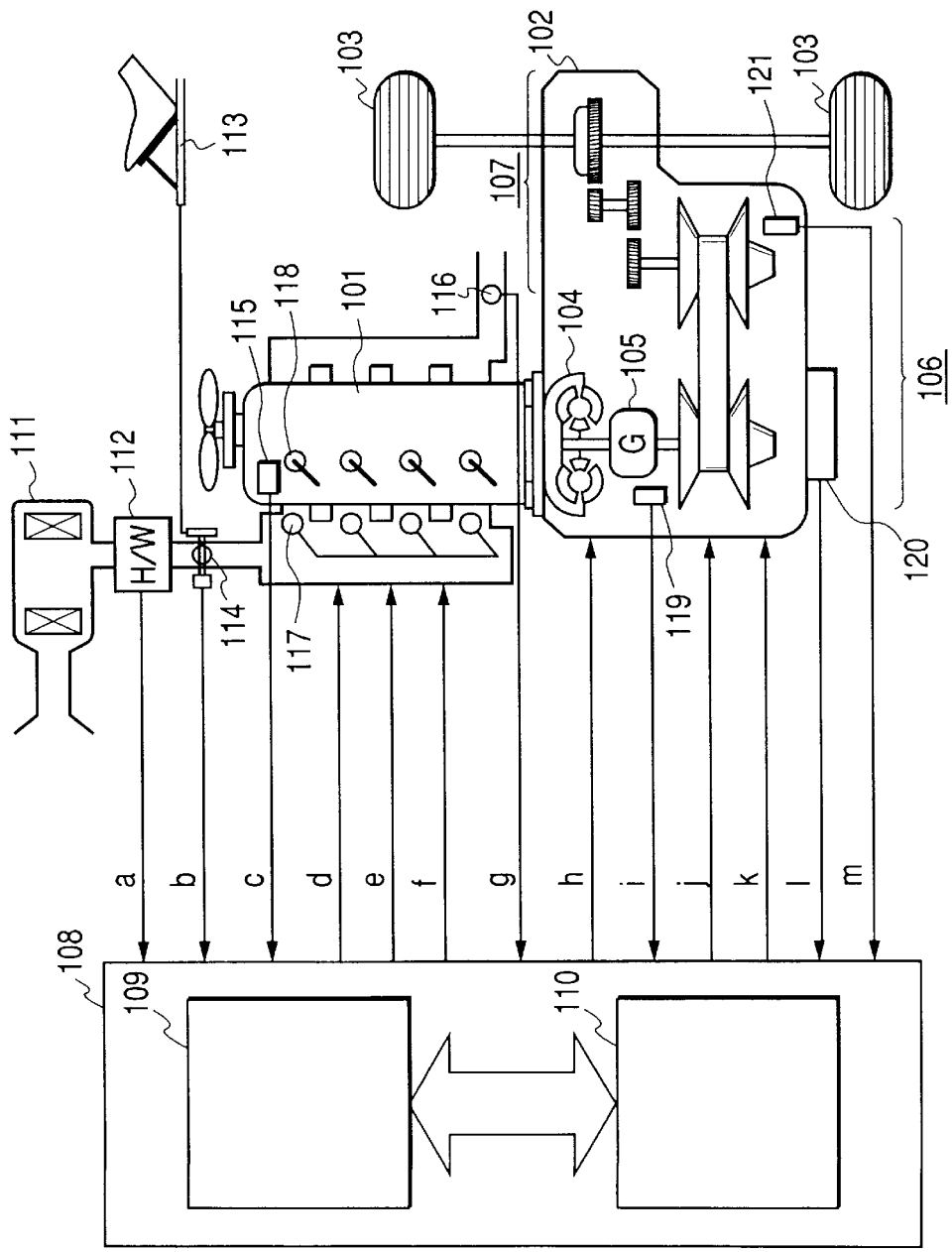
FIG. 1 is a schematic illustration showing the configuration of an input/output signal system of a drive train of a vehicle on which a CVT type automatic transmission is mounted according to a first preferred embodiment of the present invention.

In FIG. 1, reference numeral 101 denotes a so-called lean burn engine capable of varying a fuel injection amount to burn a lean mixture.

An output from the engine 101 drives wheels 103 through a CVT type automatic transmission 102. Intake air is filtered by an air filter 111 to remove dust or the like, and the amount of the intake air is measured by an air flow meter 112. The intake air is mixed with fuel supplied by injectors 117, and the air-fuel mixture is introduced into the engine 101. The intake air amount is controlled according to the opening of a throttle valve 114 operatively connected to an accelerator pedal 113. The air-fuel mixture introduced into the engine 101 is ignited by spark plugs 118 and burned to generate an output. An O2 sensor 116 is provided in an exhaust pipe to measure an oxygen concentration in exhaust gas and thereby recognize an air-fuel ratio in a combustion condition of the engine 101. The rotational speed of the engine 101 is measured by a crank angle sensor 115; the rotational speed of a primary pulley in the CVT type automatic transmission 102 is measured by a primary pulley speed sensor 119; and the rotational speed of a secondary pulley in the transmission 102 is measured by a secondary pulley speed sensor 212. The temperature of a fluid in a hydraulic circuit for operating a ratio change mechanism 106 of the transmission 102 is measured by a fluid temperature sensor 120.

In this embodiment, the transmission 102 is of a belt type such that a pulley groove width is varied by a hydraulic pressure. However, the transmission in the present invention is not limited to this type, but another type such that the pulley groove width is varied by an electric motor or a toroidal type using a friction wheel rather than a belt. That is, the transmission in the present invention may be of any type in which a transmission ratio can be continuously varied.

The CVT type automatic transmission 102 is composed of a torque converter 104, forward/reverse gears 105, ratio change mechanism 106 consisting of variable groove width pulleys and a belt, and gear train 107 including a differential gear. The components are controlled in operation by a control device 108.

Figure 2:
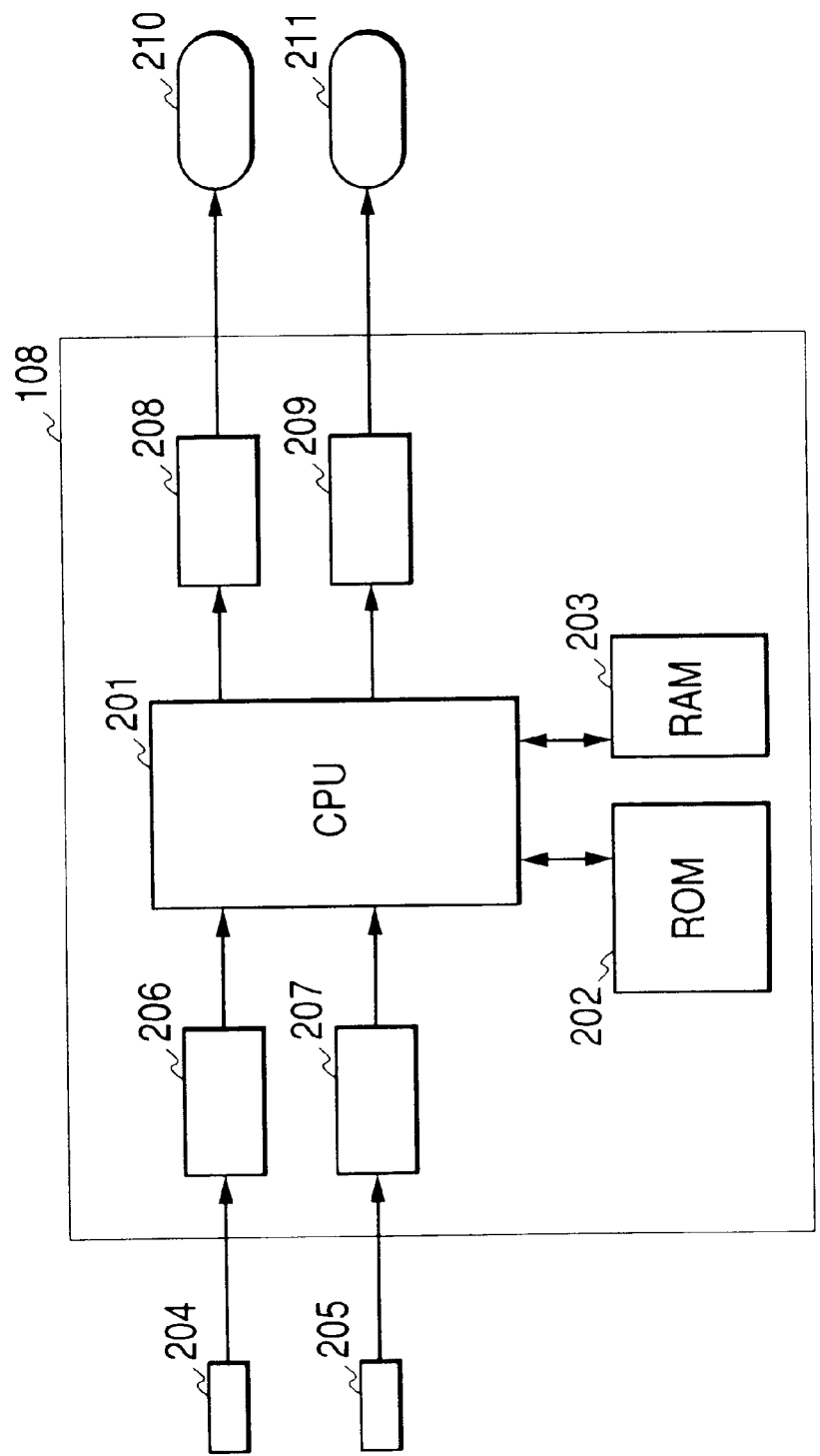
FIG. 2 is a block diagram showing a schematic configuration of a control device shown in FIG. 1.

FIG. 2 shows a schematic configuration of the control device 108. A microprocessor (CPU) 201 reads a program and data from a read-only memory (ROM) 202 and Performs numerical calculation and logical calculation by using a random access memory (RAM) 203. Data are input from various sensors 204 and 205 through input circuits 206 and 207 into the CPU 201. Output data obtained after calculations in the CPU 201 are fed through output circuits 208 and 209 to actuators 210 and 211, thereby operating the actuators 210 and 211.

The software executed in the control device 108 is composed of an engine control logic 109 for controlling the engine 101 and a CVT type automatic transmission control logic 110 for the CVT type automatic transmission 102 as shown in FIG. 1. The engine control logic 109 computes a fuel injection amount, ignition timing, blow-by gas amount, etc. according to an intake air amount signal a, throttle valve opening signal b, crank angle signal c, residual oxygen amount signal g, etc. to output control signals d, e, and f to the respective actuators. The transmission control logic 110 computes a transmission ratio, line pressure, lock-up, etc. according to a primary pulley speed signal i, secondary pulley speed signal m, hydraulic circuit fluid temperature signal l, etc. of the CVT type automatic transmission 102 to output control signals h, j, and k to the respective actuators.

Figure 3:
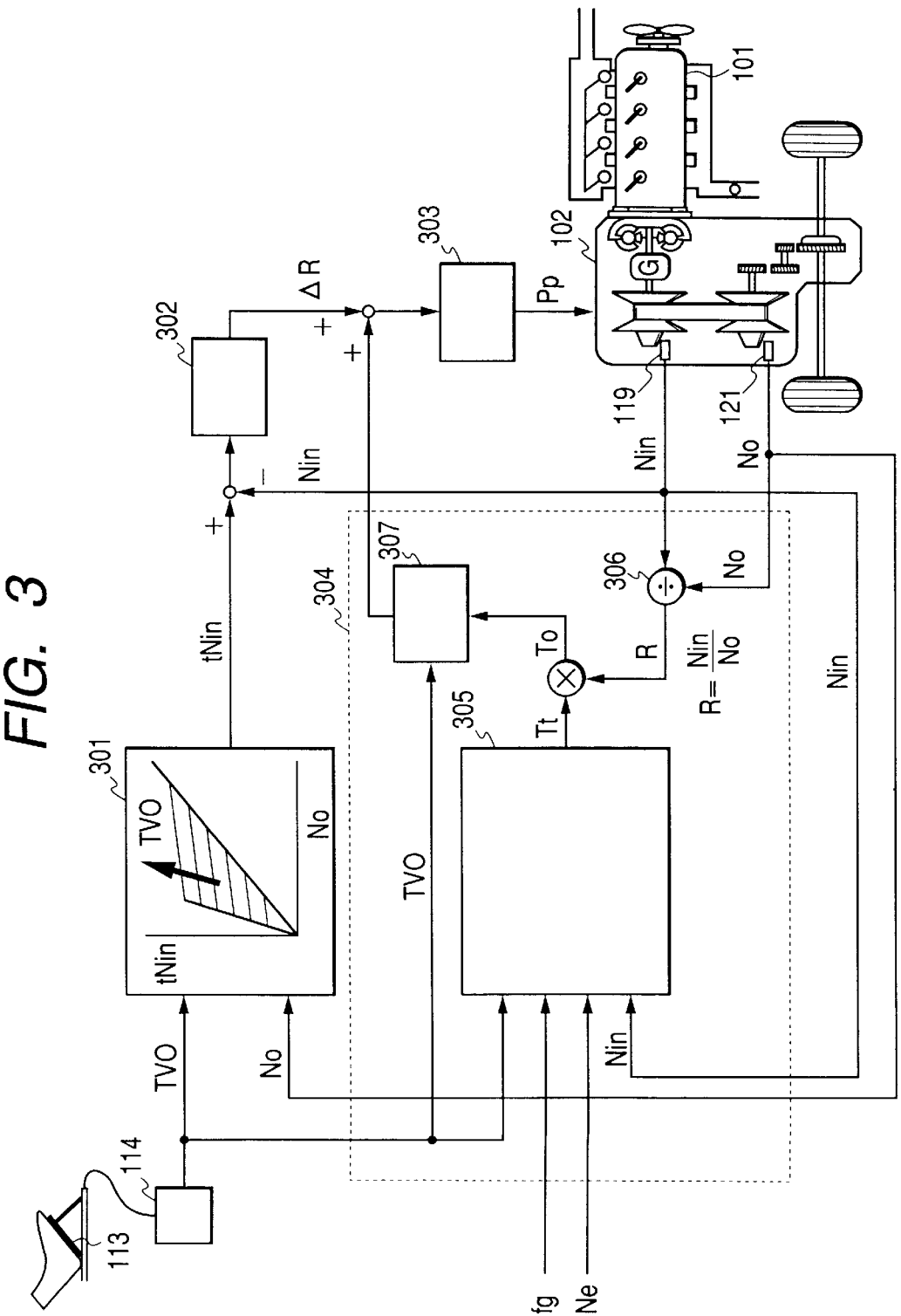
FIG. 3 is a block diagram showing the configuration of the control by the control device in FIG. 1.

FIG. 3 is a block diagram showing the configuration of the control by the first embodiment of the present invention. The opening of the throttle valve 114 is changed by depression of the accelerator pedal 113. By using a throttle valve opening signal TVO and an output shaft speed No from the secondary pulley speed sensor 121, a transmission ratio is searched from a transmission ratio data table map 301 stored in the ROM 202 to obtain a target input shaft speed tNin. The target input shaft speed tNin and an input shaft speed Nin obtained from the primary pulley speed sensor 119 are compared to obtain a deviation, which is in turn fed through a control compensator 302 to a hydraulic pressure controller 303 for controlling a primary pulley pressure Pp.

Accordingly, feedback control is performed so that the primary pulley pressure Pp is changed until the deviation becomes zero, that is, the input shift speed Nin becomes equal to the target input shaft speed tNin. The transmission ratio data table map 301 is preliminarily set so that a comfortable acceleration feeling can be obtained in consideration of engine characteristics.

However, this configuration cannot cope with the case that the engine torque suddenly changes to cause shock.

Figure 4:
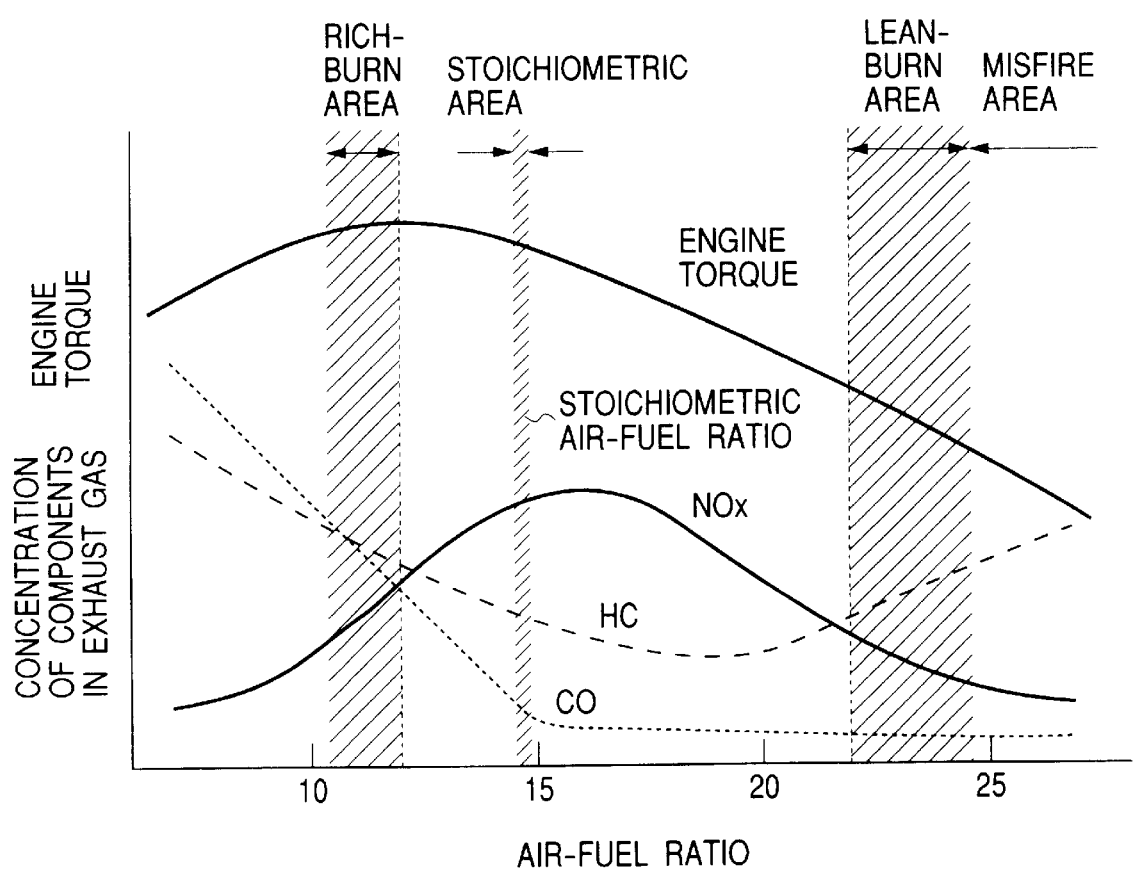
FIG. 4 is a typical characteristic graph of a lean burn engine.

FIG. 4 shows the characteristics of a lean burn engine. In general, a gasoline engine efficiently runs in a combustion condition corresponding to a stoichiometric air-fuel ratio of 14.7, that is, in a stoichiometric area, and a technique for cleaning exhaust gas has been established. In recent years, however, a lean burn running operation has been required for the purposes of resource saving and improvement in fuel economy. As shown in FIG. 4, when the air-fuel ratio (the ratio of air to fuel) is gradually increased from the stoichiometric area, the air-fuel ratio passes a running area where the concentration of nitrogen oxides NOx in the exhaust gas becomes highest. Accordingly, the engine running condition is discontinuously changed from the stoichiometric area to a running area in a lean burn condition, that is, to a lean burn area.

Conversely, in the case that the air-fuel ratio is decreased (the ratio of fuel to air is increased) at starting of the engine, that is, the engine is operated in a rich burn area, the engine running condition is similarly discontinuously changed from the stoichiometric area to the rich burn area.

Thus, a usual gasoline engine not using a lean burn area is operated always in a stoichiometric area, whereas a lean burn engine is operated in such a manner that the air-fuel ratio is discontinuously changed.

As apparent from FIG. 4, the engine torques in the rich burn area, the stoichiometric area, and the lean burn area as shown by hatched portions are different from each other. Therefore, when the air-fuel ratio is discontinuously changed between these areas, there arise steps in engine torque. That is, there arises shock upon changing of the air-fuel ratio.

Figure 5A:
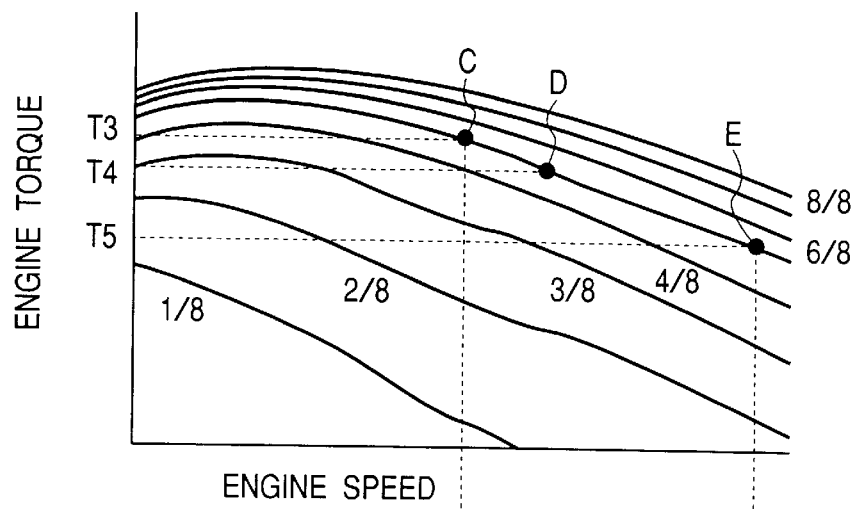
FIGS. 5A and 5B are characteristic graphs showing a change in engine torque in changing an air-fuel ratio.
Figure 5B:
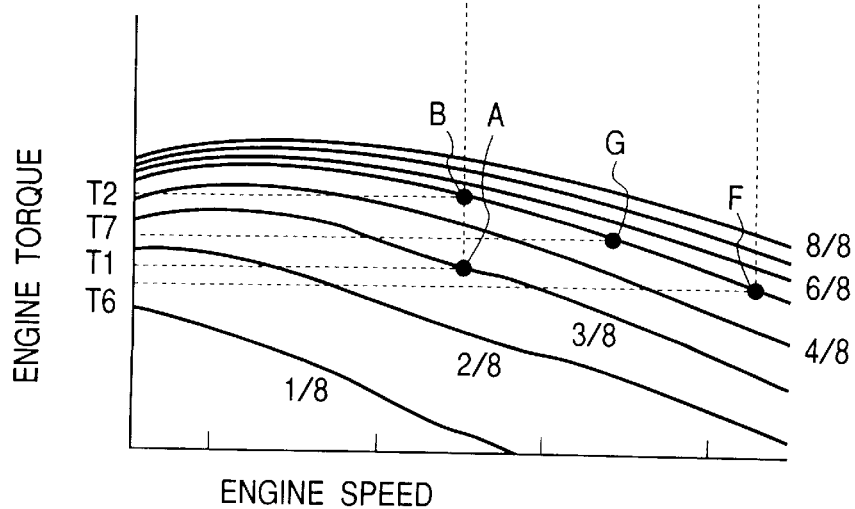

FIGS. 5A and 5B are characteristic graphs showing a change in engine torque upon changing of the air-fuel ratio. FIG. 5A shows an engine torque characteristic in a stoichiometric area, and FIG. 5B shows an engine torque characteristic in a lean burn area.

It is now assumed that the vehicle is accelerated by depressing the accelerator pedal while the engine is being operated in a lean burn area. Assuming that an operating point before depression of the accelerator pedal is a point A shown in FIG. 5B, the following two control methods are considered.

(1) In the case that the combustion condition remains a lean burn condition upon depression of the accelerator pedal, the operating point is shifted from the point A to a point B, and the engine torque is increased from T1 to T2.

(2) In the case that the combustion condition is changed from a lean burn area to a stoichiometric area upon depression of the accelerator pedal and the transmission ratio remains unchanged, the operating point is shifted from the point A to a point C shown in FIG. 5A, and the engine torque is largely increased from T1 to T3.

In the case (1), the engine torque at acceleration in the lean burn area is impractical. Accordingly, assuming that the engine is operated in the stoichiometric area only at acceleration, it is sufficient to consider the case (2) only. FIG. 6 shows a time chart of conventional control in the case (2).

Referring to FIG. 6, the accelerator pedal is depressed at time t1, and simultaneously the air-fuel ratio is changed from a lean burn area to a stoichiometric area, so that the engine torque Te is increased from T1 to T3. Since the transmission ratio R remains unchanged, the output torque To is increased from T1R1 to T3R1. By the increase in the output torque To, the vehicle is accelerated. As a result, the engine speed Ne and the output shaft speed No are gradually increased.

When the engine speed Ne increases, the engine torque Te decreases, and the operating point is shifted to a point E shown in FIG. 5A. When the engine running condition is changed to a lean burn area at time t2, the operating point is shifted to a point F shown in FIG. 5B, and the engine torque Te is stepwise decreased from T5 to T6. Assuming that the transmission ratio R does not almost change during acceleration, the output torque To is stepwise decreased from T5R1 to T6R1. Accordingly, such a torque step causes a feeling of shock.

To cope with this problem, tie present invention intentionally changes the transmission ratio R, so as to cancel the torque step. FIG. 7 shows a time chart according to the first preferred embodiment of the present invention.

Referring back to FIG. 3, a torque correcting section 304 generates a signal to be superimposed on a signal to be applied from the control compensator 302 to the hydraulic pressure controller 303. A turbine torque computing section 305 in the torque correcting section 304 inputs a throttle valve opening signal TVO, input shaft speed Nin, output shaft speed No, engine speed Ne, and engine condition flag fg to compute a turbine torque Tt by a method to be hereinafter described with reference to FIG. 8. The engine condition flag fg is a signal indicating information such as an air-fuel ratio to be fed from the engine control logic 109 to the CVT type automatic transmission control logic 110 shown in FIG. 1. When the air-fuel ratio is changed, the engine condition flag fg is changed to compute an always correct turbine torque.

A dividing section 306 in the torque correcting section 304 divides the input shaft speed Nin by the output shaft speed No to compute the transmission ratio R. The transmission ratio R thus obtained is next multiplied by the above-mentioned turbine torque Tt to obtain an output torque To.

As shown in FIG. 7, when the air-fuel ratio is changed to a stoichiometric area at time t1, the output torque To is stepwise increased. However, a corrected transmission ratio computing section 307 in the torque correcting section 304 inputs not only the output torque To but also the throttle valve opening signal TVO, and separately computes a torque change due to the change of the air-fuel ratio and a torque change due to a change in the throttle valve opening signal TVO. Then, the corrected transmission ratio computing section 307 computes a change in the transmission ratio R required to cancel the torque change due to the change of the air-fuel ratio. The change in the transmission ratio R thus computed is added to a transmission ratio change signal R, and the sum is fed to the hydraulic pressure controller 303. By such control, although the air-fuel ratio is changed upon depression of the accelerator pedal, the torque change can be suppressed to a degree similar to that in a conventional gasoline engine having a fixed air-fuel ratio.

If the above-mentioned torque change is completely canceled, the torque is lacking. Therefore, the cancellation of the torque change is restricted to such a degree that no discomfort is felt, by multiplication of a suitable coefficient.

When the air-fuel ratio is changed from the stoichiometric area to a lean burn are at time t2 shown in FIG. 7, the corrected transmission ratio computing section 307 computes a change in the transmission ratio required to cancel a change in the output torque To, in order to eliminate the stepwise change in the output torque as shown in FIG. 6. Then, the change in the transmission ratio computed above is added to the transmission ratio change signal R, and the sum is fed to the hydraulic pressure controller 303.

A change in such control with time will now be described with reference to FIG. 7.

When the accelerator pedal is depressed at time t1, the throttle valve opening signal TVO is increased and simultaneously the air-fuel ratio is changed from the lean burn area to the stoichiometric area. At this time, the engine torque Te increases from T1 at the point A to T3 at the point C shown in FIGS. 5A and 5B in the conventional method. To the contrary, according to this embodiment, the transmission ratio R is slightly decreased from R1 to R2 as shown in FIG. 7 by the operation of the corrected transmission ratio computing section 307, so that the operating point becomes a point D rather than the point C as shown in FIG. 5B, and the engine torque Te slightly increases from T1 to T4, so that the output torque To slightly increases from T1R1 to T4R2. When the output shaft speed No and the engine speed Ne gradually increase during acceleration of the vehicle, the engine torque Te gradually decreases from T4 to T5, arid the operating point becomes a point E.

When the acceleration is finished, the air-fuel ratio is changed from the stoichiometric area to the lean burn area at time t2 shown in FIG. 7. At this time, the operating point in FIG. 5 becomes a point F, and the engine torque Te decreases from T5 to T6 in the conventional method. To the contrary, the operating point becomes a point G, the engine torque Te decreases from T5 to T7, and the output torque To is changed from T5R2 to T7R3 by the operation of the corrected transmission ratio computing section 307. At this time, the transmission ratio R3 is determined so that T5R2 becomes equal to T7R3, thereby eliminating the jump in the output torque To to thereby suppress the shock.

Figure 8:
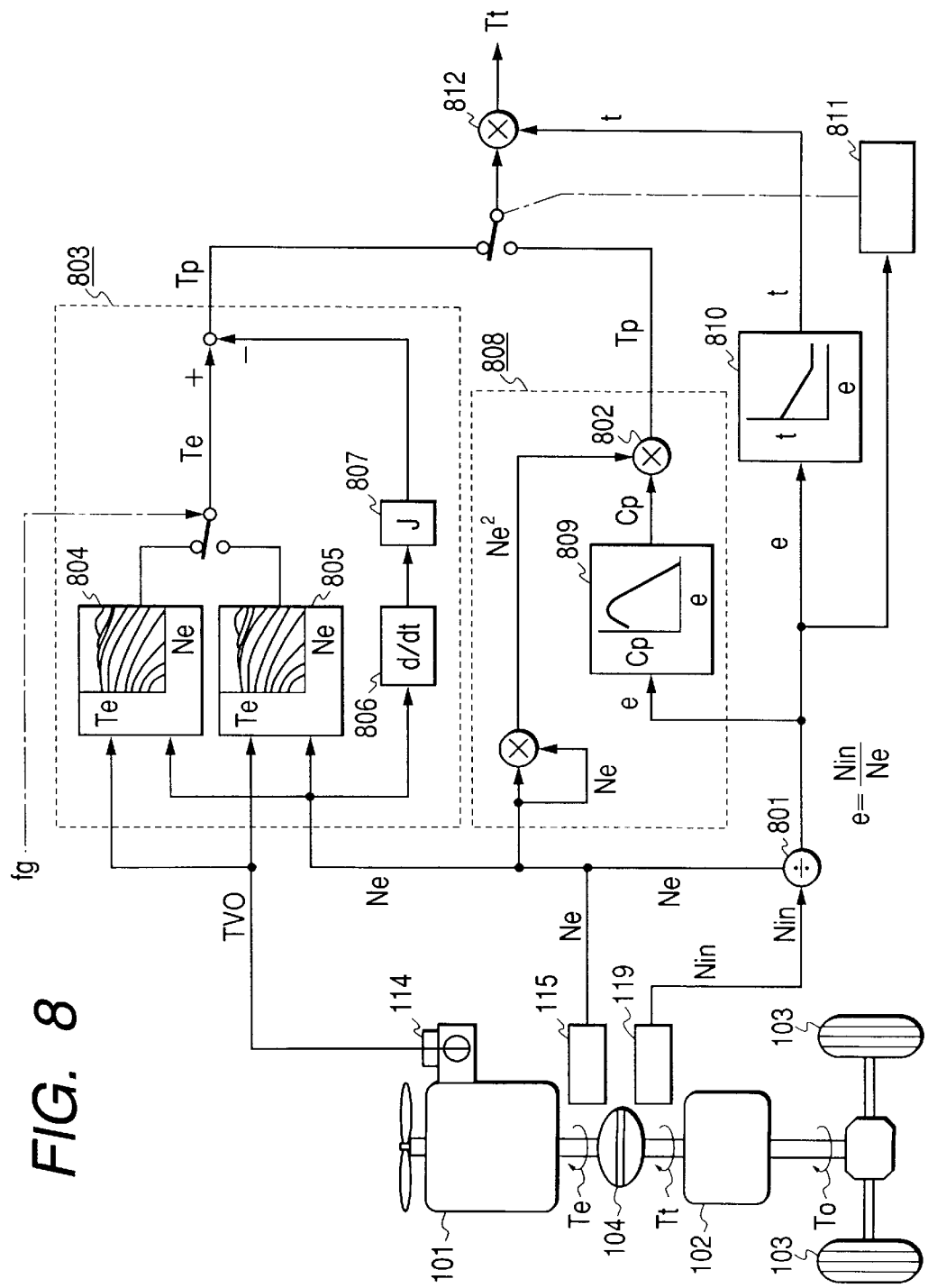
FIG. 8 is a block diagram showing the configuration of a turbine torque computing section shown in FIG. 3.

FIG. 8 shows the configuration of the turbine torque computing section 305 mentioned above.

A first pump torque computing section 803 has data table maps 804 and 805 of the engine characteristics shown in FIGS. 5A and 5B, and searches an engine torque Te according to a throttle valve opening signal TVO and an engine speed Ne. Further, the computing section 803 selects either the stoichiometric area or the lean burn area according to an engine condition flag fg. A correction value corresponding to inertia of the engine is computed by correction value computing sections 806 and 807 in the computing section 803, and the correction value thus computed is added to the above engine torque Te to obtain a pump torque Tp.

The turbine torque computing section 305 in this preferred embodiment further includes a second pump torque computing section 808 as another computer for the pump torque Tp as shown in FIG. 7. Actually, any one of the first and second pump torque computing sections 803 and 808 may be used. Alternatively, the two computing sections 803 and 808 may be used selectively according to a speed ratio e of the torque converter 104.

The second pump torque computing section 808 computes a pump torque Tp by using a data table map 809 of input capacity coefficient characteristics to the torque converter 104.

The speed ratio e of the torque converter 104 is obtained from the engine speed Ne from the crank angle sensor 115 and the turbine speed Nt obtained according to the signal from the primary pulley speed sensor 119 as shown in FIG. 7. Then, an input capacity coefficient Cp is obtained from the speed ratio e and the data table map 809, and the input capacity coefficient Cp thus obtained is multiplied by the square of the engine speed Ne to obtain the pump torque Tp.

A select decision logic 811 selects either the pump torque Tp obtained in the first rump torque computing section 803 or the pump torque Tp obtained in the second pump torque computing section 808 according to the speed ratio e.

Further, a torque ratio t is obtained from a data table map 810 of torque ratio characteristics and the speed ratio e, and the torque ratio t thus obtained is multiplied by the pump torque Tp selected above to obtain a turbine torque Tt.

As described above, according to the first preferred embodiment, it is possible to realize acceleration with less shock due to a torque change upon depression of the accelerator pedal.

Figure 9:
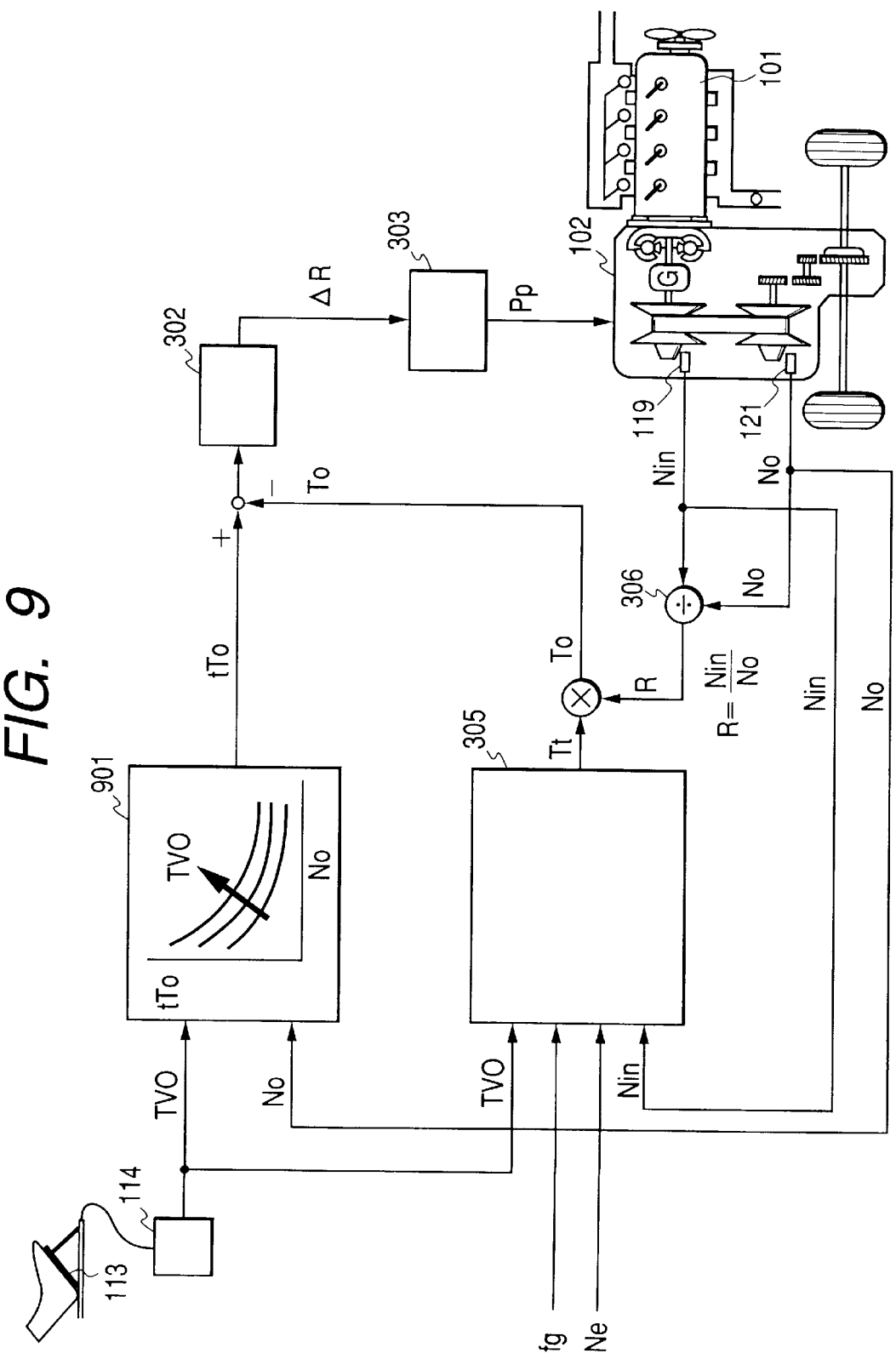
FIG. 9 is a block diagram showing a specific configuration of a CVT type automatic transmission control logic shown in FIG. 1, according to a second preferred embodiment, of the present invention.

FIGS. 9 and 10 show a second preferred embodiment of the present invention. FIG. 9 is a block diagram showing a specific configuration of the CVT type automatic transmission control logic 110 shown in FIG. 1.

A target output torque computing section 901 searches an output torque generating an acceleration by which a comfort is felt at a present vehicle speed according to a throttle valve opening signal TVO from a throttle valve 114 linked to an accelerator pedal 113 and an output shaft speed No, and outputs the torque as a target output torque tTo. That is, the target output torque tTo is determined in such a manner that the larger the depression amount of the accelerator pedal 113, the larger the target output torque, and that although the depression amount is the same, a relatively large target torque is set at a low vehicle speed so as to obtain a large acceleration, and a relatively small target torque is set at a high vehicle speed so that the driver does not fear. Thus, the target output torque tTo providing an acceleration by which an ergonomic comfort is felt can be obtained.

A turbine torque computing section 305 computes a turbine torque Tt according to the throttle valve opening signal TVO, engine speed Ne, input shaft speed Nin, and engine condition flag fg as described with reference to FIG. 8. Further, a dividing section 306 computes a transmission ratio R from the input shaft speed Nin and the output shaft speed No. The transmission ratio R is multiplied by the turbine torque T computed above to obtain an output torque To.

A deviation between the target output torque tTo and the output torque To is gain controlled in a control compensator 302 to generate a transmission ratio change signal R, which is in turn fed to a hydraulic pressure controller 303 for controlling a primary pulley pressure Pp.

The transmission ratio R is controlled in such a manner that when the output torque To is larger than the target output torque tTo, the transmission ratio R is decreased, whereas when the output torque To is smaller than the target output torque tTo, the transmission ratio R is increased, thereby making the output torque To approach the target output torque tTo. This control is continued until the output torque To becomes substantially equal to the target output torque tTo, thus constituting a feedback control loop.

FIG. 10 shows a time chart according to the second preferred embodiment of FIG. 9.

Simultaneously with depression of the accelerator pedal at time t1, the air-fuel ratio is changed from a lean burn area to a stoichiometric area. Accordingly, the engine torque Te is increased from T1 to T8, and the output torque To as the product of the engine torque Te and the transmission ratio R is also increased. However, the target output torque tTo is increased with an increase in throttle valve opening TVO, and the transmission ratio R is changed from R2 to R3 by the transmission ratio change signal R obtained by gain control of the deviation between the target output torque tTo and the output torque To as mentioned above, so that the output torque To follows the target output torque tTo. As a result, the engine torque Te changes from T8 through T9 to T10, and the engine speed Ne changes as shown in FIG. 10, thereby obtaining a smooth change in the output shaft speed No with less shock.

This feedback control loop effectively acts also in the case that the air-fuel ratio is changed from the stoichiometric area to the lean burn area when the engine running condition is returned to a normal running condition after acceleration. That is, when the stoichiometric area is changed to the lean burn area at time t2, the output torque To is decreased. Accordingly, the transmission ratio change signal R as the deviation between the output torque To and the target output torque tTo is controlled so as to increase the transmission ratio R. Thus, the output torque To follows the target output torque tTo to obtain a comfortable acceleration feeling with no shock due to torque fluctuations. The timing of changing the air-fuel ratio from the stoichiometric area to the lean burn area after acceleration may be determined by the time from depression of the accelerator pedal or by the time a change in vehicle speed after acceleration becomes small.

As described above, according to the present invention, although the air-fuel ratio is changed from the lean burn area to the stoichiometric area at acceleration by depression of the accelerator pedal, the output torque follows the target output torque changing according to the driver's intention to accelerate the vehicle, thereby obtaining a comfortable acceleration feeling with no lack and excess of acceleration. Furthermore, also when finishing the acceleration to restores the lean burn area, the output torque does not fluctuate but follows the target output torque, thereby obtaining a comfortable acceleration feeling with no shock due to torque fluctuations.

Thus, according to the present invention, it is possible to provide a control apparatus and control method for an engine powertrain which can obtain a comfortable acceleration feeling with less torque fluctuations even when changing the transmission ratio and simultaneously changing the air-fuel ratio upon acceleration by depression of the accelerator pedal.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A control apparatus for an engine powertrain of a vehicle including an engine and a CVT type automatic transmission in which a transmission ratio is continuously variable, wherein said control apparatus is configured to compute a deviation between a target value of an output torque of said vehicle based on an accelerator pedal depression amount and a vehicle speed, and a present value of said output torque based on an engine torque of said engine and a present value of said transmission ratio of said transmission and decide said transmission ratio according to said deviation of said computed output torque.

2. A control apparatus for an engine powertrain of a vehicle including an engine and a CVT type automatic transmission in which a transmission ratio is continuously variable, wherein said control apparatus recognizes a present value of said transmission ratio, computes a target output torque as a target value of an output torque of said vehicle according to an accelerator pedal depression amount and a vehicle speed, computes an engine torque of said engine, computes a present output torque according to said computed engine torque and said present value of said recognized transmission ratio, and decides said transmission ratio of said transmission according to a deviation between said computed target output torque and said computed present output torque.

3. A control apparatus according to claim 2, wherein said control apparatus generates a signal for controlling a combustion condition of said engine to a complete combustion condition corresponding to a stoichiometric air-fuel ratio when said accelerator pedal depression amount exceeds a predetermined value and varies said transmission ratio in decreasing direction.

4. A control apparatus according to claim 3, wherein said control apparatus further generates a signal for changing the combustion condition of said engine from said complete combustion condition corresponding to said stoichiometric air-fuel ratio to a lean burn condition corresponding to a lean air-fuel ratio when said accelerator pedal depression amount exceeds a predetermined value and a predetermined period of time has elapsed and varies said transmission ratio in its increasing direction.

5. A control apparatus according to claim 3, wherein said control apparatus further generates a signal for changing the combustion condition of said engine from said complete combustion condition corresponding to said stoichiometric air-fuel ratio to a lean burn condition corresponding to a lean air-fuel ratio when said accelerator pedal depression amount exceeds a predetermined value and a change rate of said vehicle speed becomes a predetermined value or less and varies said transmission ratio in its increasing direction.

6. A control method for an engine powertrain of a vehicle including an engine and a CVT type automatic transmission in which a transmission ratio is continuously variable, comprising the steps of:

computing a deviation between a target value of an output torque of said vehicle based on an accelerator pedal depression amount and a vehicle speed, and a present value of said output torque based on an engine torque of said engine and a present value of said transmission ratio of said transmission; and deciding said transmission ratio of said transmission according to said deviation of said output torque computed.

7. A control method for an engine powertrain of a vehicle including an engine and a CVT type automatic transmission in which a transmission ratio is continuously variable, comprising the steps of:

recognizing a present value of said transmission ratio;

computing a target output torque as a target value of an output torque of said vehicle according to an accelerator pedal depression amount and a vehicle speed;

computing an engine torque according to a combustion condition of said engine;

computing a present output torque according to said engine torque computed and said present value of said transmission ratio recognized; and deciding said transmission ratio of said transmission according to a deviation between said target output torque computed and said present output torque computed.

8. A control method according to claim 7, further comprising the step of generating a signal for controlling the combustion condition of said engine to a complete combustion condition corresponding to a stoichiometric air-fuel ratio when said accelerator pedal depression amount exceeds a predetermined value;

said transmission ratio being varied in its decreasing direction.

9. A control method according to claim 8, further comprising the step of generating a signal for changing the combustion condition of said engine from said complete combustion condition corresponding to said stoichiometric air-fuel ratio to a lean burn condition corresponding to a lean air-fuel ratio when said accelerator pedal depression amount exceeds a predetermined value and a predetermined period of time has elapsed;

said transmission ratio being varied in its increasing direction.

10. A control method according to claim 8, further comprising the step of generating a signal for changing the combustion condition of said engine from said complete combustion condition corresponding to said stoichiometric air-fuel ratio to a lean burn condition corresponding to a lean air-fuel ratio when said accelerator pedal depression amount exceeds a predetermined value and a change rate of said vehicle speed becomes a predetermined value or less;

said transmission ratio being varied in its increasing direction.

* * * * *